United States Patent
Lo et al.

(10) Patent No.: US 8,649,564 B2
(45) Date of Patent: Feb. 11, 2014

(54) PEDESTRIAN DETECTOR

(75) Inventors: Min-Fang Lo, Taoyuan County (TW); Li-Chen Fu, Taipei (TW); Pei-Yung Hsiao, Taipei (TW); Yi-Ming Chan, Taipei (TW); Li-An Chuang, Taipei (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 88 days.

(21) Appl. No.: 13/304,727

(22) Filed: Nov. 28, 2011

(65) Prior Publication Data

US 2013/0136308 A1   May 30, 2013

(51) Int. Cl.
*G06K 9/00*   (2006.01)
*G06K 9/56*   (2006.01)

(52) U.S. Cl.
USPC ................ 382/104; 382/170; 382/205

(58) Field of Classification Search
None
See application file for complete search history.

(56) References Cited

U.S. PATENT DOCUMENTS

2010/0289632 A1* 11/2010 Seder et al. ............... 340/436

OTHER PUBLICATIONS

Dalal et al., "Histograms of oriented gradients for human detection", Jun. 25, 2005, IEEE Computer Vision and Patter Recognition, 2005, vol. 1, p. 886-893.*

* cited by examiner

*Primary Examiner* — Stephen R Koziol
*Assistant Examiner* — Timothy Choi
(74) *Attorney, Agent, or Firm* — Jackson IPG PLLC

(57) ABSTRACT

A pedestrian detector includes an image-taking mechanism and an image analyzer. The image-taking mechanism is provided on a vehicle and used to take an image in front of the vehicle. The image analyzer is connected to the image-taking mechanism and used to receive the image from the image-taking mechanism and analyze the image to determine whether the image conforms to a pedestrian to determine whether there is a pedestrian in front of the vehicle.

5 Claims, 4 Drawing Sheets

PEDESTRIAN DETECTOR

BACKGROUND OF INVENTION

1. Field of Invention

The present invention relates to traffic safety and, more particularly, to a pedestrian detector.

2. Related Prior Art

Drivers have to pay attention to obstacles and above all pedestrians. For traffic safety, it is getting more and more attention to equip a vehicle with a pedestrian detector.

Conventionally, a pedestrian is converted to various templates. The templates are made to simulate a pedestrian at various angles in various poses.

For example, as disclosed by D. M. Gavrila, "Multi-cue Pedestrian Detection and Tracking from a Moving Vehicle," *International Journal of Computer Vision*, 2007, D. M. Gavrila, "Pedestrian Detection from a Moving Vehicle," in Proceedings of the *European Conference on Computer Vision* (ECCV), 2000, Cheng-Yi Liu, and Li-Chen Fu, "Computer Vision Based Object Detection and Recognition for Vehicle Driving," *IEEE International Conference on Robotics and Automation*, 2001, silhouettes or edge images are used to simulate the pedestrian. All of the silhouettes or edge images are converted to distance transform (DT) images.

As disclosed by M. Oren, C. Papageorgiou, P. Sinha, E. Osuna, and T. Pogio. "Pedestrian detection using wavelet templates," *Proceedings of IEEE Conference on Computer Vision and Pattern Recognition*, 1997, to solve problems related to translation, scale and orientation of the pedestrian, Harr vertical and horizontal wavelets are used to calculate wavelet coefficients for simulating image characteristics.

As disclosed by Q. Zhu, S. Avidan, M. C. Yeh, and K. T. Cheng, "Fast Human Detection Using a Cascade of Histograms of Oriented Gradients," *IEEE Conference on Computer Vision and Pattern Recognition*, 2006 and N. Dalal and B. Triggs, "Histograms of Oriented Gradients for Human Detection," *IEEE Conference on Computer Vision and Pattern Recognition*, 2005, histograms of oriented gradients are used to simulate the image characteristics. Via artificial intelligence based on a supported vector machine ("SVM"), a resultant classifier is used to effectively represent the image characteristics and detect the pedestrian.

As disclosed in N. Dalal and B. Triggs, "Histograms of Oriented Gradients for Human Detection," *IEEE Conference on Computer Vision and Pattern Recognition*, 2005, effects of using various characteristics such as HOG, Haar wavelets, PCA-SIFT and shape contexts to detect the pedestrian are analyzed and discussed. HOG has been proven to be the best measure to overcome the problems related to the variations in the look of the pedestrian. With HOG, an image is divided into segments, and the magnitudes of gradients in various orientations in the segments are summed up, and a histogram is produced.

As based on the calculation of the gradients, HOG is good in describing the edges of the obstacles. Moreover, as based on statics, HOG tolerates considerable translation and orientation of the edges. However, as based on statics, HOG is poor in providing information related to textures. For example, it is difficult for HOG to tell a long line segment from a plurality of scattered short line segments. Hence, misjudge could occur with HOG where a pedestrian is amid a disorderly environment.

As discussed above, a driver can use various apparatuses to try to detect a pedestrian. The apparatuses are however dissatisfactory.

The present invention is therefore intended to obviate or at least alleviate the problems encountered in prior art.

SUMMARY OF INVENTION

It is the primary objective of the present invention to provide an effective pedestrian detector.

To achieve the foregoing objective, the pedestrian detector includes an image-taking mechanism and an image analyzer. The image-taking mechanism is provided on a vehicle and used to take an image in front of the vehicle. The image analyzer is connected to the image-taking mechanism and used to receive the image from the image-taking mechanism and analyze the image to determine whether the image conforms to a pedestrian to determine whether there is a pedestrian in front of the vehicle.

In an aspect, the image-taking mechanism includes a camera.

In another aspect, the image analyzer includes a composite characteristic-extracting module and a supported vector machine. The composite characteristic-extracting module is used for extracting two types of characteristics of the image. The supported vector machine is used for determining whether there is a pedestrian based on the two types of characteristics.

In another aspect, the composite characteristic-extracting module includes a HOG characteristic-extracting module, a granule-based relative characteristic-extracting module and a characteristic-combination module. The HOG characteristic-extracting module is used for extracting silhouette characteristics of the image for later use. The granule-based relative characteristic-extracting module is used for extracting variations of brightness in granules of the image. The characteristic-combination module is used for combining the HOG characteristic-extracting module with the granule-based relative characteristic-extracting module to compare the two types of characteristics with each other.

In another aspect, the granule-based relative characteristic-extracting module includes a granule brightness-averaging unit and a relative value-encoding unit. The granule brightness-averaging unit is used for averaging the brightness of each granule. The relative value-encoding unit is used for producing relative characteristics of the granules.

In another aspect, the granule-based relative characteristic-extracting module extracts the variations of the brightness in the granules to produce a 10-dimensional vector to overcome errors related to the loss of the image.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
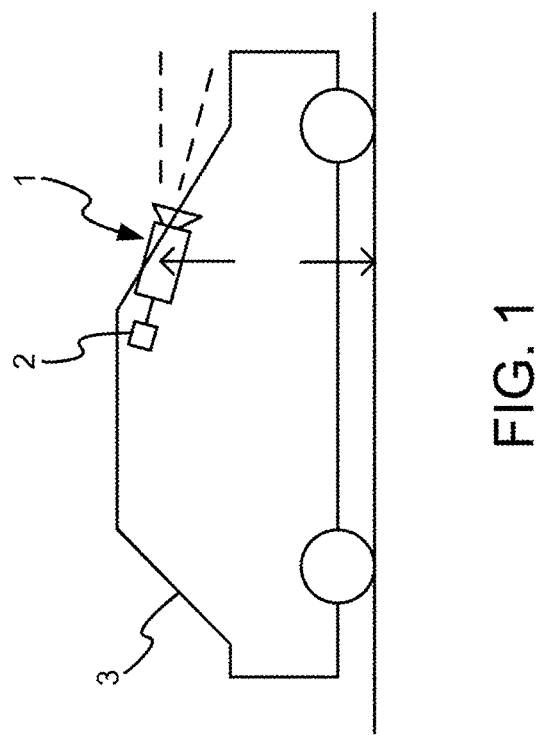
FIG. 1 is a side view of a vehicle equipped with a pedestrian detector according to the preferred embodiment of the present invention.

Referring to FIG. 1, a vehicle 3 is equipped with a pedestrian detector according to the preferred embodiment of the present invention. The pedestrian detector includes an image-taking mechanism 1 and an image analyzer 2.

The image-taking mechanism 1 is provided in or on a front portion of the vehicle 3 and used to take an image in front of the vehicle 3. The image-taking mechanism 1 may include a camera or a video camera.

The image analyzer 2 is electrically connected to the image-taking mechanism 1. The image analyzer 2 is used to receive the image from the image-taking mechanism 1. In the image analyzer 2, the image is analyzed to determine whether it conforms to a pedestrian to determine whether there is any pedestrian in front of the vehicle 3 and the position of the pedestrian if any.

Figure 2:
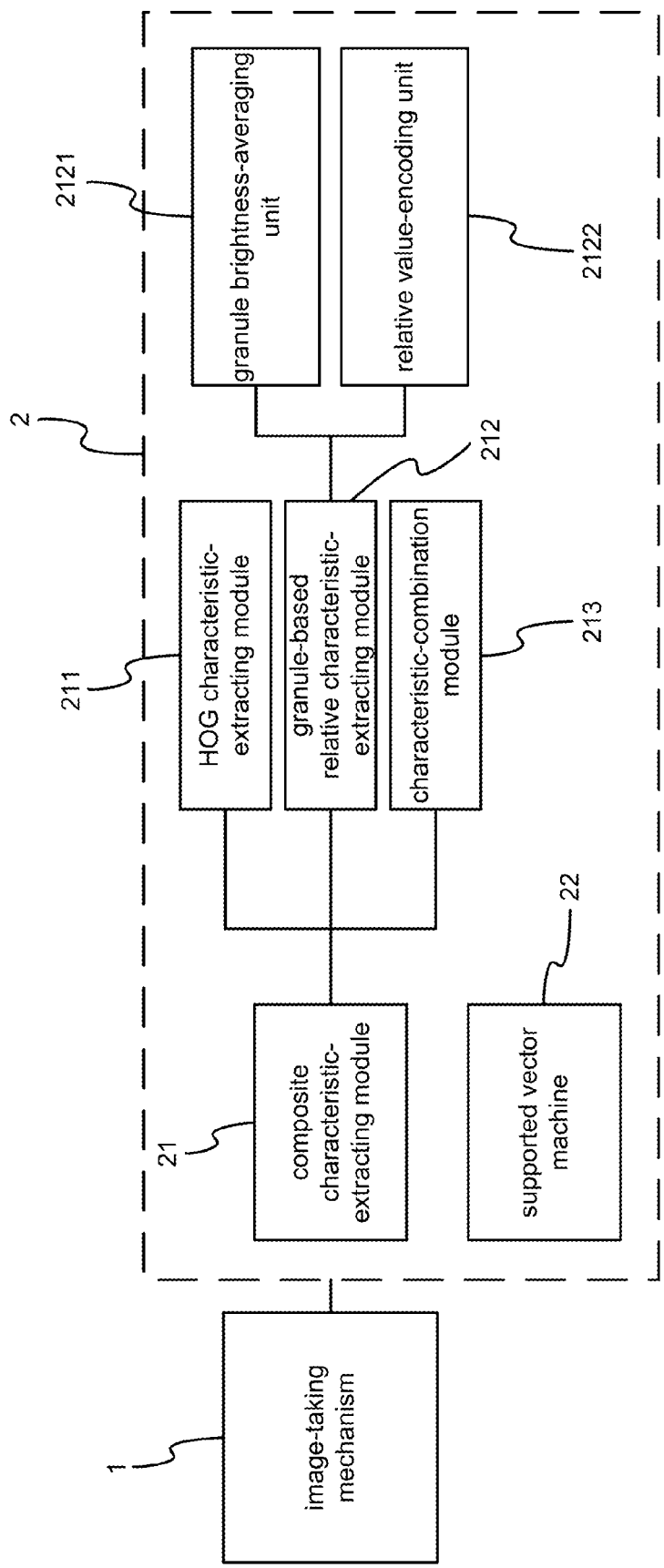
FIG. 2 is a block diagram of the pedestrian detector shown in FIG. 1.

Referring to FIG. 2, the image analyzer 2 includes a composite characteristic-extracting module 21 and a supported vector machine ("SVM") 22. The composite characteristic-extracting module 21 is used to extract two types of characteristics of the image. The SVM 22 is used to analyze the characteristics of the image and determine whether there is any pedestrian corresponding to the image.

The composite characteristic-extracting module 21 includes a HOG characteristic-extracting module 211, a granule-based relative characteristic-extracting module 212 and a characteristic-combination module 213. The HOG characteristic-extracting module 211 is used to extract silhouette characteristics for later use. The granule-based relative characteristic-extracting module 212 is used to extract brightness variations in granules 20 (FIGS. 3 and 4) of the image and provide a 10-dimensional vector to avoid errors related to loss of the image. The characteristic-combination module 213 is used to combine and compare the characteristics extracted by the HOG characteristic-extracting module 211 with those extracted by the granule-based relative characteristic-extracting module 212.

The granule-based relative characteristic-extracting module 212 includes a granule brightness-averaging unit 2121 and a relative value-encoding unit 2122. The granule brightness-averaging unit 2121 is used to average the brightness of the granules 20. The relative value-encoding unit 2122 is used to produce relative characteristic values of the granules 20.

In use, the image-taking mechanism 1 is used to take the image in front of the vehicle 3 and transmit the image to the image analyzer 2. The HOG characteristic-extracting module 211 of the composite characteristic-extracting module 21 is used to extract the HOG. The granule-based relative characteristic-extracting module 212 is used to produce the relative characteristics of the granules 20. Then, the characteristic-combination module 213 is used to combine the two types of characteristics with each other to produce the characteristic vector required by the SVM 22. Finally, the SVM 22 is used to analyze the image and determine whether there is a pedestrian corresponding to the image.

Moreover, the two types of characteristics are combined with each other to improve the effect of the pedestrian detector. In specific, the HOG characteristics are extracted as well as the relative characteristics of the granules 20 produced by the granule-based relative characteristic-extracting module 212, which consists of the granule brightness-averaging unit 2121 and the relative value-encoding unit 2122. The characteristic-combination module 213 is used to combine the characteristic vectors produced by the module 211 with the characteristic vectors produced by the module 212 to produce the single characteristic vector that includes the two types of characteristics. The number of dimensions of the single characteristic vector is identical to the sum of the number of dimensions of HOG and the number of dimensions of the granule-based relative characteristics. The single characteristic vector is transmitted to the SVM 22 to determine whether there is a pedestrian.

In the granule-based relative characteristic-extracting module 212, a granule 20 is a small square region of the image. In the present invention, the granules 20 are square regions of a constant size. The content of a granule 20 is represented by the average brightness in the granule 20. To extract relative information, the average brightness of a granule 20 is compared with the average brightness of another granule 20 to provide a binary value to represent the relative value between the two granules 20. In the present invention, bit 1 is used, g is used to present the average brightness of each granule 20, and r is used to represent the relative value between two granules 20 as follows $$r(g_i(x), g_j(x)) = \begin{cases} 1, & \text{if } g_i(x) > g_j(x) \\ 0, & \text{otherwise} \end{cases}$$

Figure 3:
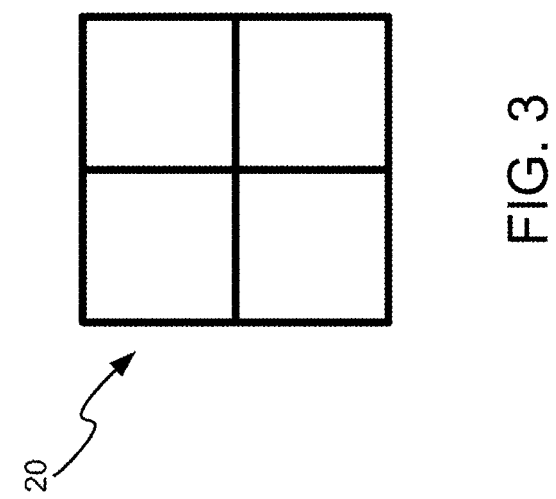
FIG. 3 shows an array of 2×2 granules used in the pedestrian detector shown in FIG. 2.

Referring to FIG. 3, shown is a square array 20a of 2×2 granules 20. There are various combinations of the four granules 20. The combinations are represented as 0 to 63 according to a predetermined sequence. Now, a dimension of the characteristic vector of the granules 20 is produced. The one-dimensional module produced via the comparison of the 2×2 granules 20 with one another is referred to as the "relative module" of the granules 20.

Figure 4:
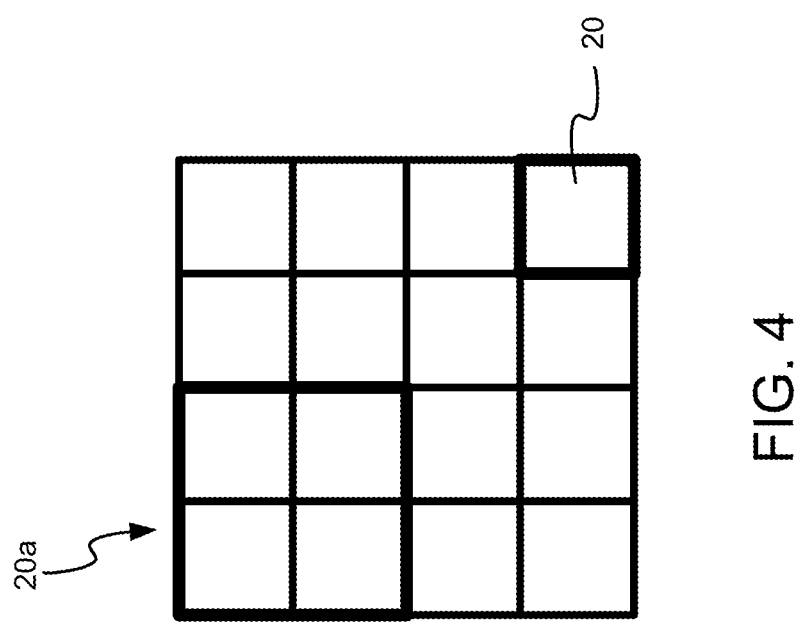
FIG. 4 shows a larger array of 4×4 arrays as the one shown in FIG. 3.

Referring to FIG. 4, the HOG characteristics are represented by a larger array consisting of 4×4 granules 20. An array 20a is processed by the granule-based relative characteristic-extracting module 212 to produce one-dimensional data. Then, calculated is the relative value of another array 20a that is translated from the previous array 20a by one granule 20.

With the 16 granules, a 9-dimensional feature vector is produced. Moreover, the array 20a is treated like a larger granule and comparison is done to produce an additional one-dimensional feature vector. Now, a 10-dimensional feature vector is produced, and the 10-dimensional feature vector is a relative feature vector of the granules 20. The relative value-encoding module 2122 is used to produce the granule relative features via calling a granule average strength-comparing module.

As discussed above, the HOG and granule-based relative characteristics are used to analyze and determine the result of the detection to improve the accuracy. Thus, a driver can be warned if there is determined to be a pedestrian in front of the vehicle 3 for safety.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:
1. A pedestrian detector including
a camera provided on a vehicle and arranged to take an image in front of the vehicle; and
an image analyzer connected to the camera so as to receive the image from the camera and comprising:
a composite feature-extracting module comprising:

a histogram of oriented gradients (HOG) feature-extracting module that extracts contour features of the image;

a granule-based comparison feature-extracting module that extracts variations of brightness in an array of granules of the image with granules considered both individually and as combined with other granules and creates a 10-dimensional vector to overcome errors related to poor quality of the image; and a feature-combination module that combines the extracted contour features of the image with the extracted variations of brightness in granules of the image and create a single feature vector that includes the extracted contour features and the extracted variations of brightness in granules of the image; and a support vector machine that determines whether there is a pedestrian based on the single feature vector and whether there is a pedestrian in front of the vehicle.

2. The pedestrian detector according to claim 1, wherein the granule-based comparison feature-extracting module includes a granule brightness-averaging unit that averages the brightness of each granule; and a-gradient-histogram-encoding unit that produces gradient features of the granules.

3. The pedestrian detector according of claim 1, wherein a size of dimensions of the single feature vector is equal to a sum of a size of dimensions of HOG and a size of dimensions of the granule-based gradient features.

4. The pedestrian detector of claim 1, wherein the array of granules is a 4 by 4 square array and the granules are processed by the granule-based comparison feature-extracting module as a plurality of 2 by 2 arrays, each 2 by 2 array translated by one granule from a previous 2 by 2 array and each 2 by 2 array resulting in a one dimensional vector such that a 9 dimensional vector is produced for the 4 by 4 array.

5. The pedestrian detector of claim 4, wherein four non-overlapping 2 by 2 arrays are each treated as four larger granules and the four larger granules are processed to obtain an additional one dimensional vector so as to produce the 10 dimensional vector.

* * * * *